United States Patent [19]
Murphy et al.

[11] 3,988,570
[45] Oct. 26, 1976

[54] CONTROLLED ACCESS AND AUTOMATIC REVENUE REPORTING SYSTEM

[75] Inventors: Arthur John Murphy, Northridge; Ray Charles Maddocks, Capistrano Beach, both of Calif.

[73] Assignee: Endyn Industries Ltd., New York, N.Y.

[22] Filed: Jan. 10, 1975

[21] Appl. No.: 539,936

[52] U.S. Cl. .................... 235/61.7 R; 194/4 R; 235/151; 340/152 R; 235/61.11 D
[51] Int. Cl.² .................... G06K 7/08; G07F 1/06; G06F 15/20
[58] Field of Search ....... 283/53; 340/147 A, 149 R, 340/149 A, 152; 52/6–9; 194/10, 4 R, 4 A, 4 B, 4 C, DIG. 23; 235/61.7 R, 61.7 B, 61.11 E, 61.11 D, 151, 61.8 A, 61.11 B

[56] References Cited
UNITED STATES PATENTS

| | | | |
|---|---|---|---|
| 2,073,834 | 3/1937 | Dvany | 194/DIG. 24 |
| 2,736,630 | 2/1956 | Cooper | 194/DIG. 23 |
| 2,769,165 | 10/1956 | Bower | 194/DIG. 23 |
| 3,212,615 | 10/1965 | Hellar | 194/4 R |
| 3,229,074 | 1/1966 | Harrington | 235/61.11 B |
| 3,275,987 | 9/1966 | Mann | 340/147 A |
| 3,374,872 | 3/1968 | Guillerm | 194/10 |
| 3,593,008 | 7/1971 | De Witt | 235/151 |
| 3,705,976 | 12/1972 | Platzman | 235/61.8 A |
| 3,876,984 | 4/1975 | Chertok | 340/149 A |

*Primary Examiner*—Daryl W. Cook
*Assistant Examiner*—Robert M. Kilgore
*Attorney, Agent, or Firm*—Singer & Singer

[57] ABSTRACT

A system for controlling access to a secure area under surveillance by a single ticket seller. A magnetically encoded ticket is sold by a ticket seller which is presented to a magnetic reader which verifies the ticket and allows passage through an electrically controlled turnstile. Verification of the ticket is automatically made and an electrical count, together with a mechanical count and a photocell count of all entries, is recorded. All detected information at a given location is recorded and controlled by a transaction terminal located on the premises. A remotely located central processing unit automatically and periodically communicates with each of a plurality of remotely located transaction terminals for causing all recorded information in each transaction terminal to be transmitted and recorded at a centrally located central processing unit.

13 Claims, 8 Drawing Figures

KEY

○ — SUMMATION

▭ — FUNCTION

◇ — DECISION

▱ — INPUT/OUTPUT

⬡ — SUBROUTINE

⬭ — END/BEGINNING

CONTROLLED ACCESS AND AUTOMATIC REVENUE REPORTING SYSTEM

This invention relates to apparatus and method for controlling access to a limited access area and to report revenues and other transactions relative to the passage of persons into and out of said area.

This invention has wide applicability for controlling and monitoring the passage of persons into and out of a limited access area and for remotely processing this information to a centrally located unit capable of monitoring a plurality of such limited access areas.

The invention is primarily concerned with mercantile establishments where a charge is made for a person entering a secured area and in which different charges are made depending on the time of day and age of the person desiring entrance.

The invention was conceived primarily in connection with problems associated with the operation of conventional movie houses.

With the advent of television the movie house industry has changed radically. In pre-television days the average movie house was a gigantic colossus having a capacity to seat over a thousand people and generally employing at least 50 persons at each location. The sale of tickets and receipts of funds were usually under the direct control of a manager who was always on hand to insure and oversee the operation.

With the advent of television the movie house industry has charged from the large colossus type of movie house to the more intimate storefront operations having capacity of 400 to 600 persons. These present day movie houses still require personnel to sell the ticket, receive the ticket, and offer services generally required by movie patrons.

Present day movie houses therefore require as an absolute minimum a person or means to sell the patron a ticket and a person or means to accept the ticket and verify that the proper ticket for the person desiring entry has been sold.

A review of the movie house operation will show that the manager or operator of the movie house is actually offering the public a service, which is to view the movie for which a charge is made to the patron depending on the patron's age and the time of day that the movie is to be viewed. For example, different charges are made depending on the age of the patron in that a higher charge is made for an adult, a lower charge made for an intermediate age group from say 12 to 18, and a lower charge made for a child below the age of 12. In addition, the movie operator charges a higher price for prime viewing time usually defined as the evenings between approximately 6 o'clock to 12 o'clock midnight. A reduced charge is usually made for the morning and afternoon viewers.

The movie house operators have been plagued with certain abuses regarding the operation of controlling access to the movie house area and the charging and collecting of revenue as a result of the proper sale of tickets for entry to the movie house area. The sale and collecting of tickets is usually under the control of part-time help having minimum requirements as to education and experience. The educational requirements for the positions are at a minimum and hence the salary paid is usually very close to minimum wage for the services rendered.

Certain abuses have been discovered in connection with the sale and passage of persons into the movie house which include the ticket seller selling a child's ticket to an adult but collecting a full adult's fare for the purchase of the ticket. The ticket seller then pockets the difference and the theater manager only knows that a child's ticket was sold and the receipt for a child's ticket was received.

More sophisticated schemes and techniques for abusing the movie manager have been discovered which usually require some collusion between the ticket taker and the ticket seller. These schemes usually involve a procedure where the ticket seller sells a ticket to a customer who then hands the ticket to the ticket taker for verification. The ticket taker then apparently tears the ticket in half thereby preventing the ticket from being used again. Unfortunately, the ticket taker does not tear the ticket up but only appears to tear the ticket and pockets the untorn ticket which is eventually returned to the ticket seller for resale. The proceeds achieved from reselling the same ticket over and over again is then surreptitiously split between the ticket taker and the ticket seller and again the movie house manager has no record of the deceit by checking either the accounts receivable or the sale of the tickets.

The most obvious way for the ticket seller to defraud the movie house operator is to simply allow friends to pass through without the need of a ticket. This procedure again is not detectable from the receipts or the sale of tickets and while it does not present any direct monetary benefit to the ticket seller or the ticker taker, the passage of persons into the movie house without the payment of a fee does represent a loss to the movie house operator which is otherwise undetectable.

The most obvious method of correcting these deficiencies is to have and utilize ticket takers and ticket sellers that are more handsomely rewarded and preferably are in some managerial capacity so as to otherwise reduce the possibility of mismanagement in the sale and retention of tickets. Unfortunately, the smaller movie houses of today do not warrant a plurality of managers and in fact do not even warrant a single manager on the premises for the normal operation of the movie house. The manager of today is usually a manager of a plurality of movie houses and usually spends his time traveling from one operation to another in order to properly oversee and determine that each movie house is operating in the proper manner. The problems of a single manager on a busy Saturday night overseeing a plurality of movie houses is obvious and at best unsatisfactory.

The prior art has recognized these problems and has attempted to automate the sale of tickets and the entry of the patron into the movie house. These techniques have generally been unsatisfactory since the public is not willing to accept entry into a movie house that has all the security of a bank vault. Such techniques have met with limited success in that the public generally expects a movie house to look like a movie house and not like a prison. In addition, the public has accepted the concept of purchasing a ticket from a ticket seller which he then uses to obtain entrance to the movie house. At the same time the public has rejected the concept of utilizing automatic ticket vending machines for movie house operations. It can only be surmised that the general public buying a ticket for a movie house encompasses the very young below 12 years old to the intermediate and the adult which includes senior citizens of an advanced age. Automatic vending machines capable of dispensing a variety of tickets based upon age and time and for a plurality of different shows at the present time appear to be more complicated than the average patron for a movie house is willing or capable of comprehending.

The concept of vending tickets from automatic machines has been accepted by the commuter in use with railroad systems, however, we can only assume that the average commuter is of a class in age and education and temperament that he is willing to accept the repetitive automatic dispensing of tickets for the convenience and speed afforded over the selling of individual tickets by individual ticket sellers.

The prior art has attempted to solve these problems of the modern movie house but unfortunately until the advent of the present invention has been significantly unsuccessful.

In the present invention the problems associated with the prior art devices have been alleviated through the concept of utilizing magnetically encoded cards under the control of a ticket seller, thereby providing the public with an individual from which to purchase the ticket and encode the original point of sale transaction. Thereafter the patron takes the magnetically encoded ticket to a ticket taker which is an automatic device for reading and interpreting the magnetically encoded ticket. A transaction terminal under the control of a micro-computer reads the ticket and determines whether the ticket is valid as to the facility being used and as to the time of use of the ticket. If the encoded ticket is determined to be less than an adult which is either an intermediate ticket or a child's ticket, a sequence camera is energized which photographs the patron while at the same time the electrically controlled turnstile is released to allow a single passage.

In order to provide a realistic count of persons passing through the turnstile, there is also provided on the turnstile a mechanical count of the veeder-root type and an electrical count that is energized for every revolution of the turnstile in the forward direction.

The turnstile area is also provided with a photocell detecting device capable of detecting the passage of all persons through the entry area which is necessary in order to detect the passage of persons that may attempt to go over or under the turnstile without inserting a ticket into the ticket taker.

Exit from the movie house is preferably through an exit turnstile which is freely rotatable in the exit direction and also contains a mechanical counter and an electrical counter together with a photocell for detecting the passage of all persons through the exit area.

All information concerning the sale of the ticket and the passage of persons through the entry turnstile and the exit turnstile is recorded in memory in the transaction terminal located at the individual movie house. This information would include code name for the individual ticket seller and all sales taking place under the control of that particular ticket seller. All transactions of the entry turnstile which include the electrical count and photocells are also recorded together with all transactions at the exit turnstile which include the electrical count and the photocell count.

The individual transaction terminal at each movie house is connected to a modum and the telephone lines to be used and interrogated by a central processing unit located at some remote location.

The central processing unit may be located at any convenient remote location convenient to the manager or operator of the individual movie house or chain of movie houses. The central processing unit, also called the CPU, is under the control of a micro-computer and also includes a modum for sequentially and automatically calling each of the remotely located movie houses on some pre-determined schedule.

The individual movie house for example may be called on an hourly schedule or 2 hour schedule or even on a 24 hour schedule, depending on the kind of movie being shown and the schedule of shows made available to the public. The CCU under the control of the micro-computer periodically calls the individual movie house and after verification of the identity of the CCU, the information in memory at the transaction terminal of the movie house is transmitted to memory located within the CCU. Upon complete transmission the call is terminated and all information received in memory at the CCU is printed onto a teletype machine for review by the manager or operator of the chain of movie houses.

The printout will then show the manager the sales volume of the individual movie house during the programmed time interval and at the same time verification can be made of the number of tickets sold and the number of passages through the entry turnstile. The recorded information will also allow the manager to verify the photocell count with the actual turn count of the turnstile to verify that people are not going over or under the turnstile mechanism. At the same time a verification can be made of the exit turnstile to determine a correlation between the photocell count and the counter count on the turnstile mechanism.

For example, should the exit turnstile information show a larger photocell count than turnstile count it can only be assumed that people are entering the movie house through the exit door and that a check should be made. Similarly, an increased photocell count at the entry turnstile over the local count on the entry turnstile will show that patrons are going over or under the entry turnstile and that a check should be made.

Experience has shown, however, that the main problem in remotely operating a movie house is not with the general public but rather with the local operators as mentioned previously. The system described above provides a means where the manager can remotely verify the operation of the individual movie house and precisely and promptly identify any misuse in the sale of tickets by the ticket seller. For example, a spot check of the sequence camera against the sale of children's tickets will immediately verify whether the ticket seller is selling children's tickets to an adult. In addition, a general pattern in the use of the movie house is quickly established in that a larger percentage of children and intermediate tickets are sold in the morning and afternoon with the highest percentage of adult tickets being sold in the evenings. Should the record on the teletype printout shown an abnormally large sale of children or intermediate tickets in the evening, the manager would immediately know that a check is in order, which would of course require immediate investigation.

The present invention provides for control of a limited access area and for a prompt evaluation of the revenue obtained from that limited access area and in real time that enables the manager or operator to quickly determine any misuse of the system.

Further objects and advantages of the present invention will be made more apparent by referring now to the accompanying drawings wherein.

Figure 1:
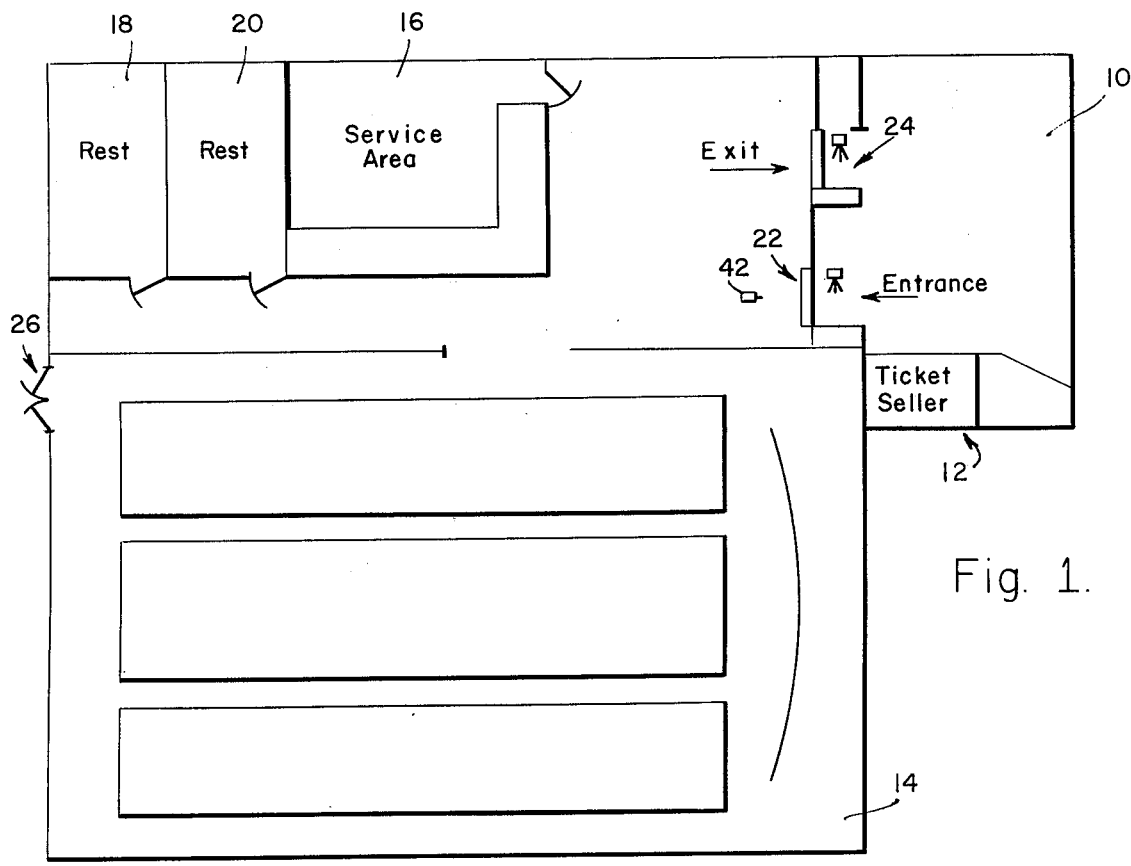
FIG. 1 is a plan view illustrating the physical layout of a movie house having a single showing.

Referring now to FIG. 1, there is shown a preferred embodiment illustrating a controlled access to a limited area comprising the showing of a single movie.

The entrance area 10 is dominated by a ticket seller area 12 usually located within a secured enclosure for housing a ticket seller who dispenses tickets and holds all receipts.

The secured area comprises the movie display section 14, a service area 16, and suitable restrooms 18 and 20. Entrance to the secured area is normally obtained through a turnstile controlled entrance-way 22 whereas exit from the secured area may either be obtained through an exit way 24 under control of an exit turnstile and in emergency through emergency exit 26 controlled by a panic exit door which opens from the inside by suitable pressure in the event of an emergency. Normally the exit door 26 will be closed and entrance will be obtained through 22 and exit through 24.

Figure 2:
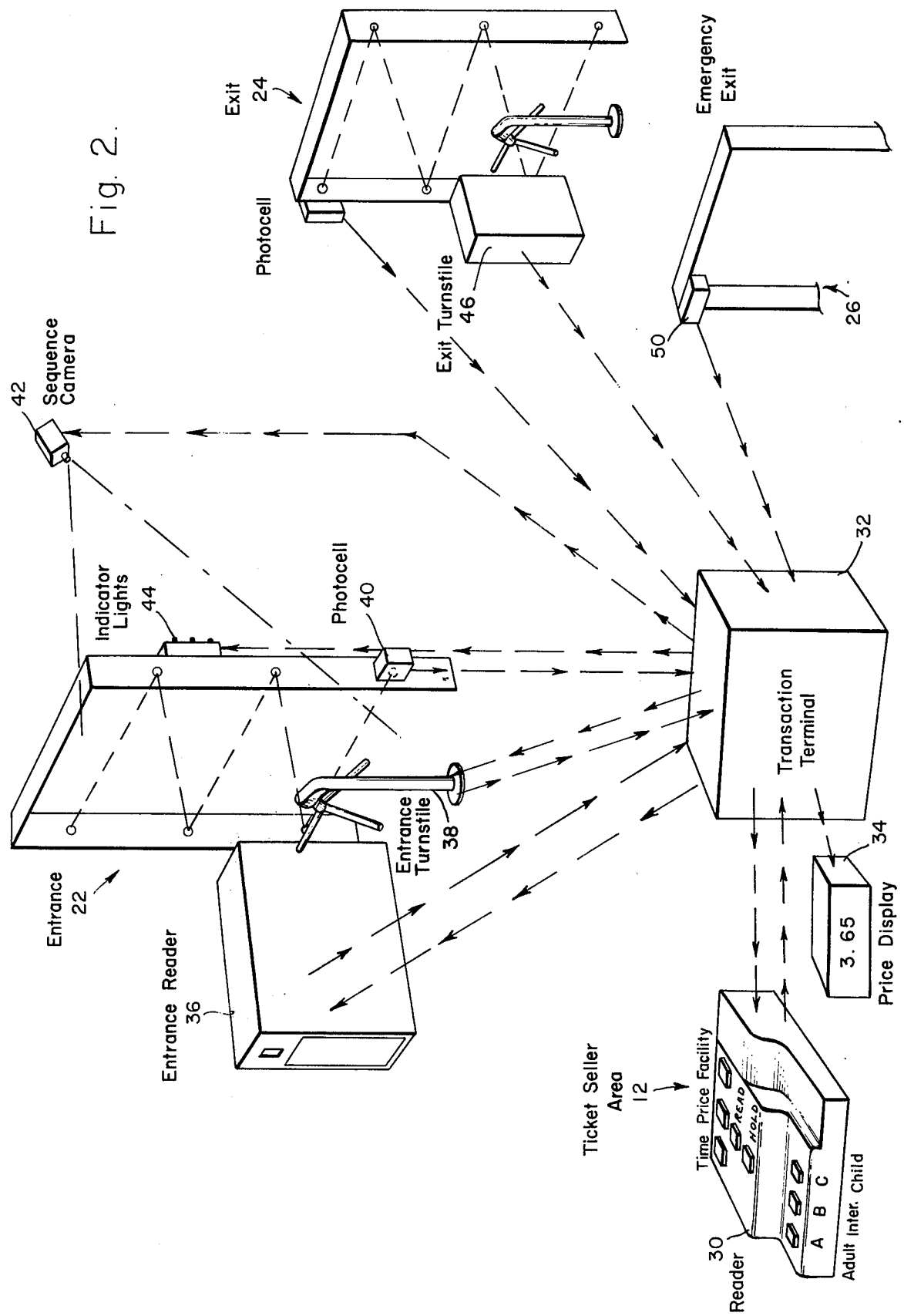
FIG. 2 is a pictorial illustration of the system illustrated in FIG. 1 showing the physical location of all essential parts.

Referring now to FIG. 2, there is shown the component parts associated with the secured movie operation illustrated in FIG. 1.

In operation, the patron will approach the ticket seller 12 and identify to the ticket seller the ticket or tickets desired. Assuming the patron is an adult, the ticket seller will insert a ticket having a magnetic stripe into a ticket seller reader 30 under the exclusive control of the ticket seller 12. The ticket seller will depress the appropriate button which in this case is labeled Adult, which causes a transaction terminal 32 consisting in part of a micro computer to energize a price display 34 with the appropriate adult price for display to the patron and also to cause the ticket seller reader 30 to magnetically encode the magnetic striped ticket with information relative to time of sale, price of ticket, and a facility code which uniquely identifies the movie house operation.

The transaction terminal 32 controls the ticket seller reader 30 to return the magnetically encoded card to the ticket seller who then hands the card to the patron.

Access to the movie house is achieved by the patron taking the magnetically encoded ticket to the entrance 22 where the magnetically encoded ticket is inserted into an entrance reader 36.

Inserting the ticket into the entrance reader 36 causes the ticket to be read by the entrance reader 36 which is connected to the transaction terminal 32 where the magnetically encoded information on the card is compared as to the time, the price, and the facility.

In the event the patron has purchased a ticket from a different facility and not the one in question, the transaction terminal 32 will detect this difference by comparing the facility code on the magnetically encoded ticket with the hard wired facility code located within the transaction terminal. Should the facility code on the ticket not correlate with the recorded facility code in the transaction terminal 32, the entrance reader 36 will return the ticket to the patron and entrance to the movie area will be denied.

The patron will then return the ticket to the ticket seller 12 and in all probability complain that the ticket or the machine is inoperative. The ticket seller will then place the ticket into the ticket seller reader 30 and press the appropriate Read button which will indicate to the transaction terminal 32 to read the information on the card and display the information on the price display 34. The ticket seller will then depress the Time button which will indicate the time on the price display 34 and sequentially, by pressing the price button, the price will be displayed and upon depressing the Facility button the facility number will be displayed on the display 34, thereby indicating to the ticket seller that the ticket is improperly used in this facility, which information is then communicated to the patron with a correct explanation that tickets purchased at one facility cannot be used at a different facility.

This point should be emphasized since it must be remembered that different facilities will in all probability be displaying different movies having different admission costs and in order to provide security against misuse of tickets, it is necessary to prevent the patron from purchasing a ticket at a lower priced movie in one part of town and then using that ticket to obtain entrance to a more expensive movie showing at another location in town.

Should the patron, for example, purchase an adult ticket in the morning when the price of the ticket is at a minimum and attempt to use the ticket in the evening prime time, the transaction terminal 32 will compare the time encoded on the ticket against the real time when the ticket is being used and reject the ticket from the entrance reader 36 in the same fashion as previously described in connection with the ticket used at the incorrect facility. The process will then be repeated and the ticket seller 12 will be able to verify the ticket and indicate that the time and, hence, the price of the ticket do not correlate.

Assuming that the adult patron has purchased an adult ticket that is properly used by way of time, price and facility, the transaction terminal 32 will correlate the information on the magnetically encoded ticket read by the entrance reader 36 and in response to a proper correlation, the transaction terminal will capture the ticket in the entrance reader 36 and erase the magnetically encoded information on the ticket and at the same time impulse an electrically operated entrance turnstile 38 located in the entrance 22. The patron will then pass through the entrance turnstile 38, thereby interrupting a photocell light detecting equipment 40 which is connected to the transaction terminal 32 and which records each interruption of the light beam. The entrance turnstile 38 records a count that is recorded in the transaction terminal every time the turnstile mechanism is rotated. In this fashion each rotation of the entrance turnstile 38 registers a positive count within the transaction terminal that can be correlated against a count indicated by the photocell mechanism 40 which also detects and counts each interruption of the light beam.

The sale of a ticket to a child patron or an intermediate patron is accomplished in the same manner as the sale to the adult patron. The ticket seller 12 will press the appropriate button on the ticket seller reader 30 which will encode the ticket with the appropriate time, price and facility code. transaction operates The patron inserts the magnetically encoded ticket into the entrance reader 36, which information is read by the transaction terminal 32 and due to the price on the magnetically encoded ticket, the ticket is immediately identified as either a minor or an intermediate ticket. In either of these two events, the minor ticket is detected by the transaction terminal 32 which then energizes a sequence camera 42 suitably positioned so as to have a clear field of view of the patron entering through the entrance turnstile 38. At the same time the transaction terminal 32 operates a plurality of classifier lights 44 which are coded to indicate either the minor ticket or the intermediate ticket as detected by the transaction terminal.

At the same time the transaction terminal 32 energizes the entrance turnstile 38 thereby allowing the patron to pass through the entrance area 22 and to be suitably photographed by the camera 42 which not only photographs the patron but also photographs the classifier lights 44 to thereby allow the viewer an opportunity to correlate the kind of ticket sold to the person detected within the camera. At the same time, rotation of the entrance turnstile 38 causes an impulse to be recorded at the transaction terminal 32 while at the same time the patron breaking the photocell beam causes the photocell detector 40 to cause an indication to be recorded by the transaction terminal.

In order to provide complete security and proper accounting of all persons entering or leaving the limited access area, it is necessary that any person having access to the limited area do so by means of a proper magnetically encoded ticket.

The movie house being a place of business, it is apparent that certain people performing services for the movie house have access in connection with their business needs. The system is designed to accept four classes of passes identified as Management, Vendor, Authority, Complimentary. Passes falling into any of the four identified categories are magnetically encoded and issed to the recipients of the passes in question. For example, Management passes would encompass those directly concerned with the operating and running of the movie house. A Vendor pass would be issued to those persons providing maintenance and service to the movie house such as cleaning persons and those operating the service areas or delivering goods used within the secured area. Authority passes would be issued to the police and fire departments and any other regulatory specified by the appropriate Municipal Code. Complimentary passes are those passes under the direct control of Management and issued to persons for specific business reasons as determined by Management.

The individual passes as mentioned previously are magnetically encoded and given to the recipient who keeps the pass in his permanent possession until used. For example, should a vendor need access to the movie house, he would give his pass to the ticket seller who would press the Pass button on the ticket seller reader 30 and insert the vendor's pass into the ticket seller reader, thereby causing the transaction terminal 32 to read the pass and verify the correctness of the information recorded on the magnetically encoded pass. The price display 34, under the control of the transaction terminal 32, would indicate Pass and the transaction terminal 32 would cause the ticket seller reader 30 to return the pass to the ticket seller 12 who would in turn return the pass to the vendor. The ticket seller 12 then inserts a ticket into the ticket seller reader 30 which accepts the ticket and magnetically encodes the ticket with the information from the pass as read and detected by the transaction terminal 32. The ticket is magnetically encoded so that the ticket is identified as a Pass ticket and the classification of the Pass ticket in question.

The vendor does not use the complimentary encoded pass as an entrance ticket but, rather, uses the magnetically coded ticket given him by the ticket seller. The procedure used by the vendor is then the same as with any other patron in that the vendor inserts his magnetically encoded ticket into the entrance reader 36 which is detected by the transaction terminal as a pass and which causes the entrance turnstile 38 to be released while at the same time energizing the classifier lights 44 which are coded to indicate that the ticket is a complimentary pass ticket while at the same time the sequence camera 42 is energized to photograph the classifier lights and the vendor as he passes through and breaks the photocell light detector 40. In this fashion each ticket encoded as a pass is recorded and detected by the transaction terminal 32 as a pass and the movement of the vendor through the entrance area 22 is detected and recorded in order to provide the complete sequence and recordation of all persons passing through the entrance area into the limited access area.

By way of review, it will be noted that the transaction terminal 32 operates the classifier lights 44 and the sequence camera 42 whenever the ticket is identified as either a minor or intermediate ticket or if the ticket was obtained by means of a pass. A spot check of the developed film in the sequence camera 42 will provide immediate correlation between the person detected and the sequence lights 44 as to whether the person is either a vendor, a fireman, a policeman, a child, or an intermediate young adult. In any event, all rotations of the entrance turnstile 38 are recorded as well as all breaks in the photocell beam 40 to thereby provide an immediate indication whether patrons are going over or under the turnstile without inserting a ticket. In addition, mechanical counters physically located on the entrance turnstile are used to record each rotation of the entrance turnstile 38 as a further check against the electrically recorded rotations fed back to and recorded within the transaction terminal 32.

Exit from the limited access area can be achieved either through the emergency panic door 26 or the normal exit area 24.

The exit area 24 contains an exit turnstile 46 that is freely rotatable in the exit direction only. A person leaving the limited acess area through the exit area 24 simply pushes against the exit turnstile 46 which causes the turnstile to rotate and allows the patron to exit. A photocell detector 48 is located within the door jamb of the exit area 24 so that any passage or movement of persons through the exit area is detected and recorded within the transaction terminal 32, in the same fashion that every rotation of the exit turnstile 46 is separately recorded within the transaction terminal.

The emergency panic door 26 contains an interlock 50 that is connected to the transaction terminal 32 which detects in real time whenever the emergency door is open and the time that the door is closed.

A review of the system illustrated in FIGS. 1 and 2 will show that the movement of all persons into the limited access area is detected and recorded and uniquely identified within the transaction terminal 32. Similarly, all persons leaving the limited access area through the exit 24 will be recorded by each turn of the exit turnstile 46 and by the braking of the photocell detecting mechanism 48. In addition, the exit turnstile 46 contains a mechanical counter for recording each turn of the exit turnstile. If for any reason persons attempted to enter the limited access area through the exit 24, their presence would be detected by the photocell detecting means 48 and a review of the movement of persons into and out of the limited access area would show a discrepancy as a result of periodically reviewing the recorded information within the transaction terminal. The emergency panic door 26 is required by local statutes and should the door be opened either on purpose or by accident, the time of the opening and closing will be recorded so that a review of the recorded information within the transaction terminal 32 will indicate a discrepancy in the passage of persons that can be properly explained.

Figure 3:
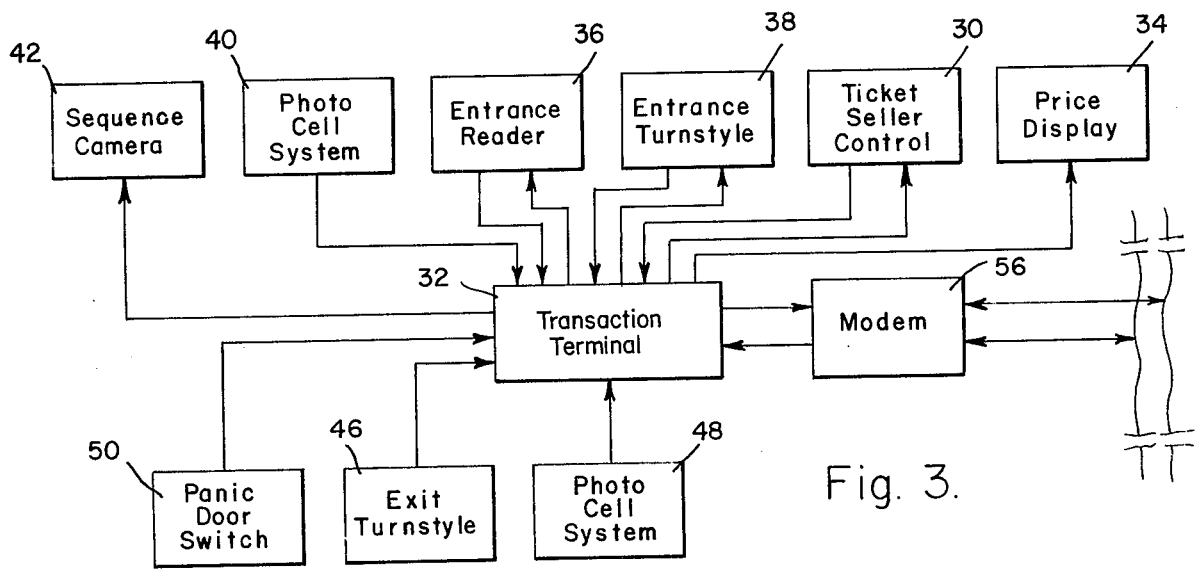
FIG. 3 is a block diagram illustrating electrical interconnections of the system illustrated in FIG. 1.

Referring now to FIG. 3, there is shown a block diagram illustrating the electrical connections of the system just described in connection with FIGS. 1 and 2.

The transaction terminal 32 comprises a micro-computer that is properly programmed to perform the functions described in connection with FIGS. 1 and 2 and to record this information and to transmit this information on demand.

The transaction terminal 32 records all information in real time regarding the sale of tickets indicated by the ticket seller control 30. All counts from the entrance photocell system 40 and the exit photocell system 48 as well as counts from the entrance turnstile 38 and the exit turnstile 46 are similarly recorded. Opening and closing of the panic door switch 50 is also recorded within the transaction terminal 32, in addition to the operation controls performed by the transaction terminal described in connection with operating the sequence camera 42 indicating the price on display 34 and operating the entrance turnstile 38.

The transaction terminal 32 is connected to a suitable modum 56 which is connected to the telephone lines which allow the transaction terminal to be called from a remote location in order to interrogate and receive all of the recorded information recorded by the transaction terminal during a given time period.

Figure 4:
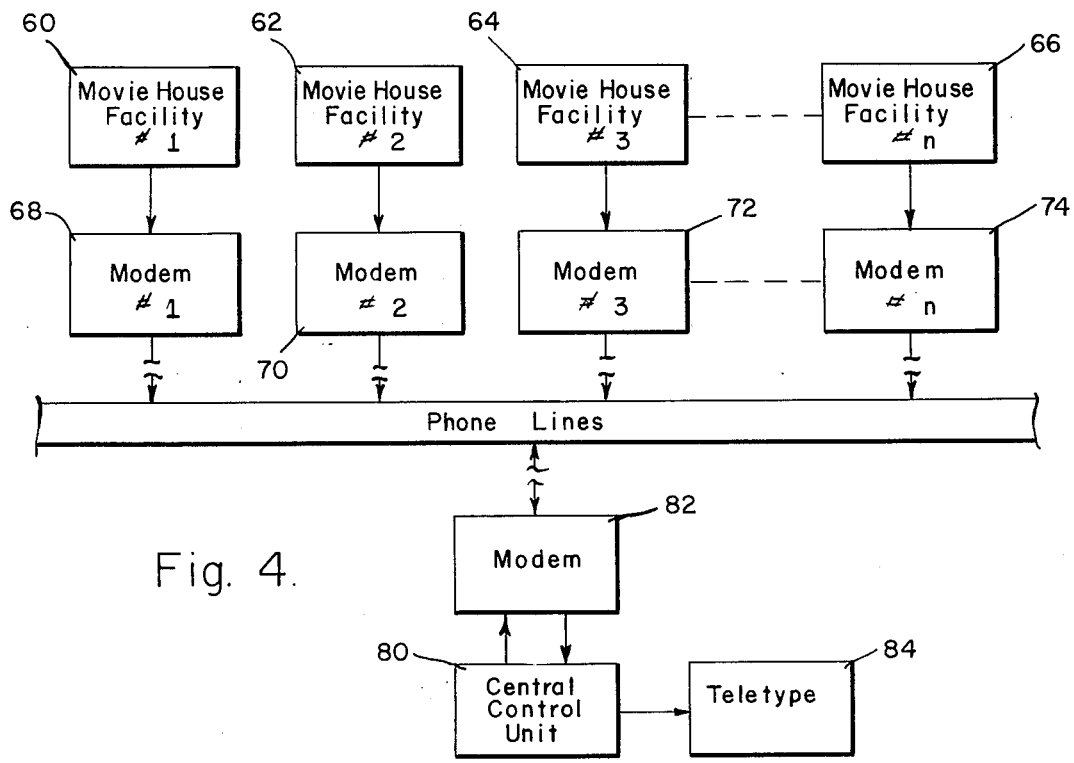
FIG. 4 is a block diagram illustrating how an externally located central control unit communicates with a plurality of individual movie houses.

Referring now to FIG. 4, there is shown a block diagram illustrating how a central control unit located at some convenient remote location can conveniently interrogate and receive recorded information from a plurality of remotely located movie houses.

The ultimate purpose of the present invention is to provide a means for a manager to supervise a plurality of individual movie houses that may be located in the same town or in different towns or areas from each other.

In FIG. 4 there is illustrated a plurality of transaction terminals, each located in a different movie house 60, 62, 64 and 66. The location of the individual movie houses is determined only by business considerations since the movie houses may be located in the same town, in different areas of the town, or in different towns near or far from each other.

Each of the movie houses has associated with it a modum 68, 70, 72 and 74, respectively, that are each connected to the telephone lines in order to allow interrogation from an external source.

A central control unit 80 consisting in part of a microcomputer has associated with it a modum 82 that is also connected to the telephone lines and used to interrogate each of the movie houses 60, 62, 64 and 66 through their associated modum 68, 70, 72 and 74. Information received by the central control unit 80 is fed to a conventional teletype printout 84 in order to allow a supervisor located in the same area as the central control unit 80 to review information from each of the individual movie houses and at a sequence determined solely by the programming of the microcomputer associated with the central control unit 80.

The purpose of the central control unit 80 is to periodically dial up and establish contact with the individual movie houses on a periodic and sequential basis in order to poll each movie house of information recorded by each associated transaction terminal and to receive all of said recorded information polled from the individual movie house for a display on the teletype printout 84.

The central control unit 80 has the capability of dialing up each individual theater and establishing communication with the individual facility on a predetermined schedule based in part upon the activity taking place at that facility and the supervision desired by the operator located at the central control unit. The predetermined sequence is completely arbitrary and may be every hour, every four hours, or even every 24 hours as determined by the operator. In any event, it is possible for the operator at the central control unit 80 to override the predetermined sequence and to individually poll any facility and at any time.

Communication between the central control unit 80 and the individual facilities is accomplished by means of a dial up telephone network in which the central control unit establishes communication with the individual facility and identifies itself by means of an identification code that is hard wired at the central control unit. Upon proper identification the information stored in the transaction terminal of the individual movie facility is polled and the stored information is transmitted to the central control unit 80 where it is stored in memory and eventually displayed on the teletype printout 84.

During the period of communication between the central control unit 80 and the individual facility, a master clock in the central control unit determines and transmits the time and date which is recorded by the facility to insure that the individual facility and the central control unit are in time and date synchronization.

Figure 5:
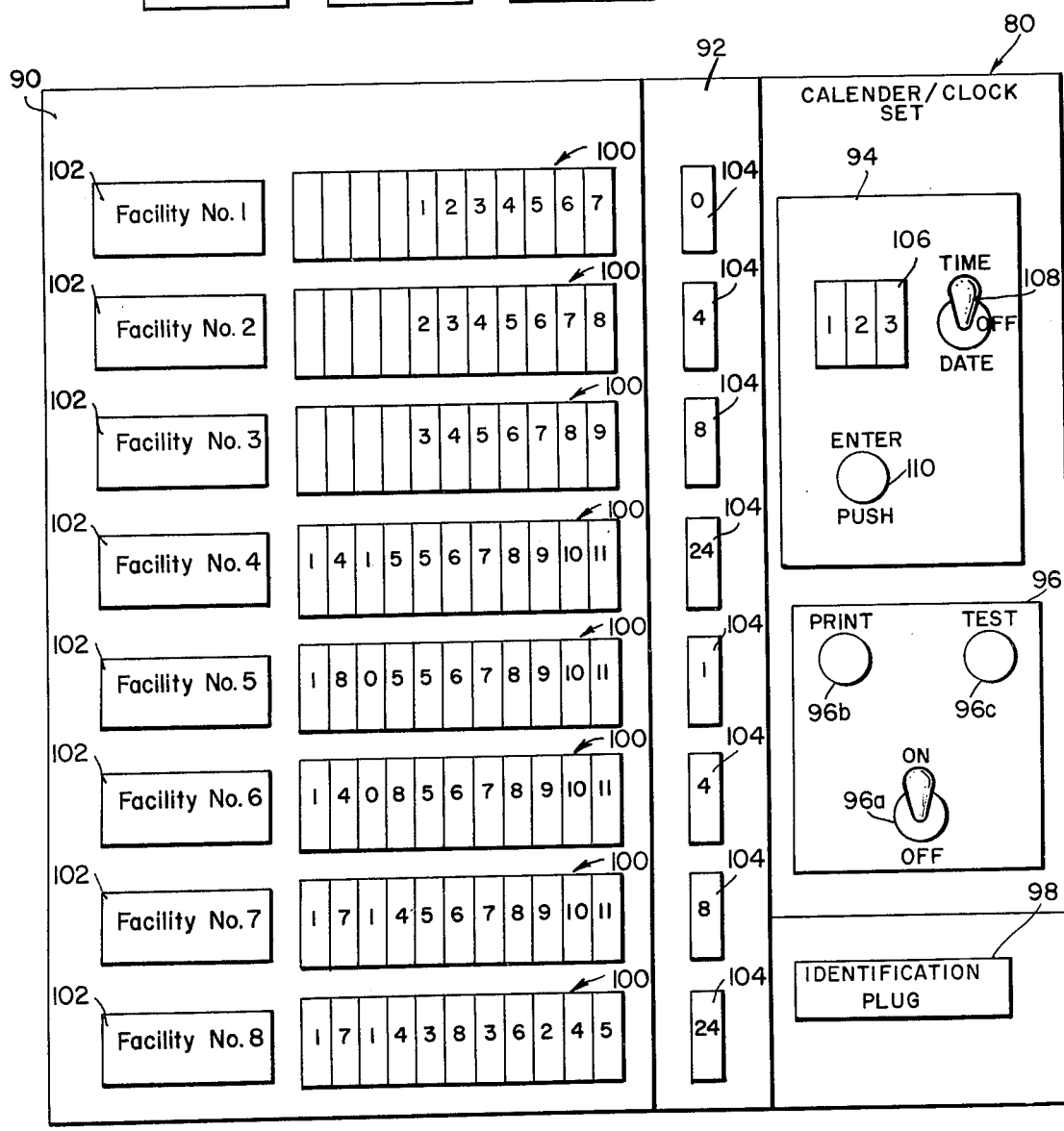
FIG. 5 illustrates the control panel of the central control unit used to poll individual movie houses.

Referring now to FIG. 5, there is shown a preferred control panel associated with the micro-computer forming part of the central control unit 80.

The control panel for the central control unit is divided into five parts for controlling the facility being polled 90, the polling interval 92, the time and/or date 94, the test and print control 96, and a hard wired identification plug 98 which uniquely identifies the central control unit that is polling the individual and remotely located facilities.

In the preferred embodiment, provision is made for inserting the telephone number for eight different facilities. The telephone number is inserted for each facility by means of eleven thumbnail switches associated with each facility being polled. For local calls only seven digits are necessary as illustrated in connection with facility number 1. However, for long distance calls illustrated in connection with facility nos. 4, 5, 6, 7 and 8, it is necessary to use all eleven digits.

In order to provide manual override and the polling of an individual facility at a time other than the programmed interval, a special polling switch 102 located for each facility is provided. In other words, should the supervisor desire aa readout from facility number 7 at a time other than the programmed sequence for polling facility number 7, it is only necessary to depress the special polling switch 102 associated with facility number 7 to cause the central control unit to begin dialing the telephone number associated with facility number 7 to thereby begin the sequence for initiating the telephone call, establishing communications, and obtain a transfer of recorded information from the transaction terminal associated with facility number 7.

The polling interval is determined according to coded switches 104 that are associated one for each facility. Each of the coded switches 104 is precoded to cause the central control unit to dial the associated facility according to a preset schedule. For example, coded switch 104 associated with facility number 1 is coded zero which will indicate that facility number 1 is not on the line and should not be called. The coded switch 104 associated with facility number 2 is coded to indicate that facility number 2 will be called every four hours for the transfer of information. In a similar manner, the coded switch 104 associated with facility number 5 is coded to require facility number 5 to be called every hour whereas coded switch 104 associated with facility number 8 is coded to require facility number 8 to be called every 24 hours.

The time and date are initially set up by the operator in the time and date control section 94 by means of a common three digit control 106. A three position switch 108 is used to either indicate time or date and also contains an Off position.

The operator establishes the initial conditions; to set the date he simply places switch 108 in the date position and establishes the date in the three position digital control 106. The information is entered into the micro-computer by depressing push button switch 110 labeled Enter Push.

In order to set the initial time within the micro-computer, the three position switch 108 is set in the time position and the three position digital control 106 is set for the initial time, at which point push button switch 110 is depressed thereby establishing the initial conditions for time and the clock associated with the micro-computer associated with the central control unit.

The last function performed by the control panel is the identification plug 98 which is hard wired and uniquely identifies the specific central control unit. The identification plug 98 is necessary since it is envisioned that many central control units may be on the line calling different facilities which are otherwise unassociated with each other. The identification code hard wired within the identification plug 98 is transmitted to the called facility and must be verified by the individual facility called within a given period of time, otherwise communication is immediately cancelled thereby preventing unauthorized information from being transmitted to an incorrect source that is improperly identified.

The test or print function is controlled by an On and Off toggle switch 96a. With the toggle switch 96a in the On position depressing the print push button 96b will cause the information already accumulated in memory from a prior interrogation to be subsequently printed onto the teletype machine for viewing and analysis. In this manner the supervisor on duty at the CCU can continually check and recheck the operation and review information previously accumulated in memory.

Depressing the test push button 96c results in a pre-programmed test pattern being accumulated in memory and eventually printed on the teletype. Depressing the test button will therefore insure to the operator that the complete memory and printout mechanism associated with the CCU is operating correctly. Since the pre-recorded routine is inserted in memory, it follows therefore that all previous accumulations will be wiped out when running the CCU through the complete test.

Figure 6:
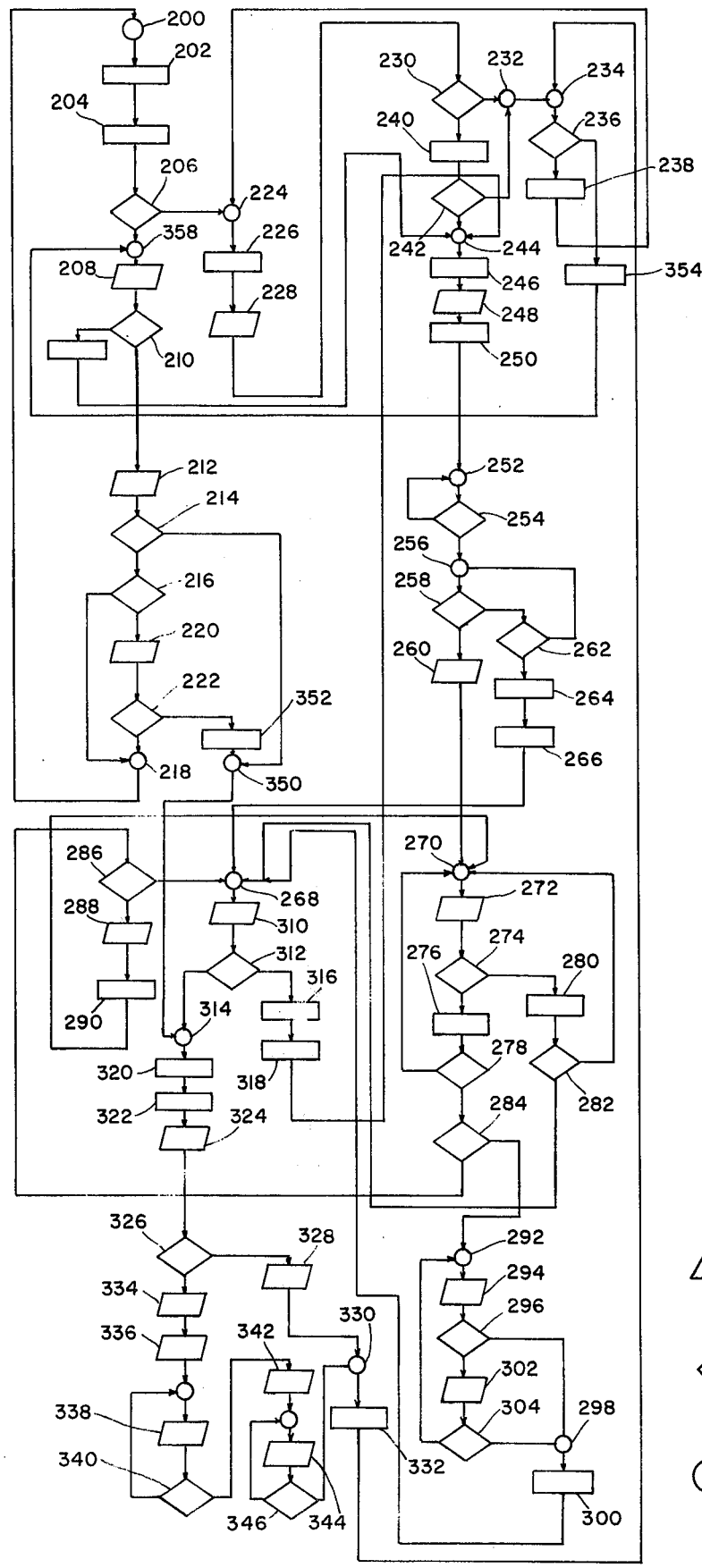
FIG. 6 is a flow diagram for a central control unit capable of communicating with a plurality of external movie houses as illustrated in FIG. 4.

Referring now to FIG. 6, there is shown a plurality of diagrams comprising a flow chart illustrating the sequence of events performed by the central processing unit in automatically calling and sequentially processing data from the plurality of individual and remotely located facilities.

A review of the flow chart will more fully illustrate the functions previously described in connection with FIG. 5. The convention used in interpreting the flow chart is consistent with that used in the art today in which the statement of the function appears in a square box and the actual decision is indicated in the diamond shaped box. The circular notation is used to indicate the junction of more than one line when appropriate in performing the function or plurality of functions indicated.

The equipment is first put on the line by pressing a suitably located Start button 200 which is located in the main loop that first establishes initial conditions 202 with respect to time and date. The initial conditions are preset and inserted by suitable sub-routines under the control of the operator when the equipment is first energized.

The main loop includes an update time and date sequence 204 which utilizes the main 60-cycle power source as the synchronizing source for establishing time pulses. The sub-routine is programmed to establish an update on the time every 6 minutes and an update on the date every 24 hours as measured from the initial conditions.

The main loop then includes a decision of time to dial 206 since the coded sequence switches described in connection with FIG. 5 provide for the calling or polling sequence to occur on multiples of the hour, therefore the time to dial sub-routine 206 establishes whether the time is on the hour or not. A no-decision causes a reading of the manual dial select switches 208 to determine if the operator has pressed any of the manual select switches to cause a readout at some time other than the programmed sequence. A decision at 210 indicating No will then cause a search of the print request switch 212 to determine if the operator had depressed the print request switch to review the information previously deposited in the memory. A decision at 214 if No will cause a decision at 216 to determine if the main power is on. If the decision is No the jump is made to summation 218 which returns the main loop to the Start position 200, thereby repeating the main loop control. If the decision at 216 is Yes the main power is on, then the test print request switch is reviewed at 220 to determine if the operator has requested a test program to be inserted in memory which is then to be printed on the teletype. If the decision at 222 is No, the loop continues to summation point 218 which again feeds the start circuit 200 thereby completing the main loop. The decision to test the main power 216 before testing the test print request switch at 220 is made in order to preserve information previously received from a facility that is now located in memory. If for any reason the main power is not on and the test print request switch had been depressed, the next subroutine would load the memory with test data thereby destroying the previously recorded information received from the remote facility.

If we assume that the time to dial decision 206 is Yes, which means that it is now on the hour, a Yes decision will feed a summation point 224 for setting up a dial sequence 226. The first decision is to read the individual polling interval switches 228 to determine the sequence of the individual facility to be polled. The control panel for the individual central control unit has the capability of calling eight different facilities, however, in the event that less than eight facilities are being used, the code zero is used to indicate that that position is not being used and hence a decision at 230 determines the presence of a code zero. If the decision was a code zero, the next decision past junction 232 and 234 is a decision as to whether the detected code zero was the last switch as determined by decision 236. A No decision results in a direction 238 to go to read the next dial frequency switch which returns the path to junction 224 and the setup dial 226 for repeating the loop.

The next test will continue until an active switch is detected and the code zero decision 230 results in a No decision which then tests the present time versus the sequence code in 240. This statement will result in a decision as to whether the next number should be dialed at this time, which decision is made in number to be dialed decision 242. A No decision returns to junction 232 and 234 for a last switch decision in 236. If the decision and number to be dialed 242 is a Yes, then the sequence for setting up the dial routine is fed from junction 244. The dial routine from junction 244 is energized after a decision is made that a number is to be dialed. The first step is to set up the dial and data received function 246 and thereafter to take the phone off the hook and set up the data access arrangement and dial routine as set forth in 248. In order to prepare the memory for receiving new information, the old memory is cleared as set forth in 250.

The next step after passing junction 252 is to determine when the dial routine as set forth in 248 is finished. This is determined by end of dial decision 254 which feeds a junction 256 if Yes and if No, the decision is recycled back to junction 252 until the end of dial decision is determined.

When the end of dial decision is made at 254, a carrier-on decision 258 is made to determine that communication has been established with the called facility. The carrier-on determination is basically a frequency tone that is detected after a given period of time to establish that the carrier is on. If the decision is Yes a control character and ID number of the CCU is transmitted as at 260. Should the carrier-on decision 258 result in no decision, an error determination decision is made at 262 which looks for an increment error 264 which basically establishes a given period of time after which a decision to go to hang-up phone 266 is established which feeds junction 268. The output of go to hang-up phone at 266 is basically a hang-up signal which results from no carrier being detected by the carrier-on decision 258.

In the event the carrier is detected, function 260 will transmit a three digit control character which is basically a non-printing character, and the ID number of the calling CCU. The output of function 260 feeds junction 270 which is the beginning of a new loop which establishes the receiving mode for the CCU after having established communication with the facility being called and also after having identified itself to the receiving facility. At this point in time the transaction terminal in the facility being called will verify the ID number of the calling CCU and if correct go into a transmitting mode for transmitting recorded information at the facility to the calling CCU.

The recorded information in the transaction terminal of the remote facility is transmitted and recorded at the CCU during the received text mode 272. The received text is continually being checked for error by error in text decision 274 which, if correct, the information goes to store text in memory 276 which continually feeds an end of text decision 278. The end of text is usually determined by a special character which if not received the decision is not the end of text and the output is fed back to junction 270 which maintains the loop until the end of text message is received.

In the event an error in text decision 274 determines an error, an increment error count 280 is initiated and a third error is detected in third error decision 282 which immediately feeds junction 268 to initiate a hang-up decision. In the event the third error decision 282 does not detect the third error, the No output is fed back to junction 270 to continue the loop until the end of text message from decision 278.

A decision is then made as to any errors received in the message or in the third retransmit in decision 284. If the answer is Yes, which means there may be one or two errors, the output is fed to a third error decision 286 which feeds junction 268 if a third error was detected. In the event there was less than three errors, a request for retransmit is made in 288 and a decision made to receive the text 290 which effectively asks for a retransmit of the text without hanging up since the output is fed to junction 270 which places the unit in a receive mode.

In the event the decision of any error or third retransmit in decision 284 is No, the output is fed to junction 292 on the assumption the received transmission is error free since only three retransmits are permitted before going off hook and only three errors are allowed in any one transmission. The signal appearing at junction 292 therefore assures the equipment that the text was received error free and that an end of text message has been received from the transaction terminal. The CCU then transmits an updated time and date signal and a clear memory command function 294, which signal is transmitted to the transmission terminal located at the facility being called. In this fashion the transaction terminal gets an updated time and date signal and the information contained in memory at the transaction terminal is cleared. A decision is then made as to whether the signal was transmitted three times in decision 296. If the answer is Yes that the time and date signal and clear memory command at 294 was transmitted three times, then the Yes output feeds junction 298 energizing a go to on hook command 300 which eventually feeds junction 268 as mentioned previously.

If the decision of the third transmit 296 is No, the CCU looks for the received answer 302 which is a signal transmitted by the transaction terminal indicating receipt of the time and date signal and clear memory command. In the alternative, the transaction terminal may request a retransmit of the time and date and clear memory command signal, which decision is made in 304. Should an inquire character be transmitted by the transaction terminal, the decision of 304 then feeds junction 292, causing a second transmission of the transmit time and date and clear memory command from 294. This loop will continue for no more than three transmissions after which the third transmit decision 296 will either feed junction 298 and cause the CCU to go off hook or the decision of 304 is No and 298 junction will again be energized, only in this case the go to on hook signal 300 will result from a completed transmission rather than an abortive attempt to complete transmission.

A review of junction 268 will show that the inputs feeding that junction are common to the same problem where termination of the call had to be terminated because no carrier was received or a third error in the text was received or a third request to transmit time and date and clear command signal was received. In any event a go on hook command 310 is initiated and a decision made to redial the same number in decision 312 is made. Decision 312 actually requires a check of the error register to determine if there were no more than three errors. If the decision is No, then junction 314 is fed which sets up the teletype print routine whereas if more than three errors were determined a read dial loop is initiated by first establishing a wait of ten seconds command 316 and then initiating a go to redial function 318. The output of go to redial 318 feeds junction 244 which initially set up the dial routine previously described.

The teletype routine is established from junction 314 which commands a set up to print and turn teletype on 320 which feeds an update time and date function 322 and causes the print as to time, date and line information 324. The line ID information is needed for the telephone line called even if for any reason the telephone call could not be put through. This is necessary since there is provided facilities for indicating on the teletype printout that the number was called but that no meaningful information was received and hence it is necessary to indicate that the number was called but that the information could not be reproduced.

A decision is made to determine whether the text has been received correctly in decision 326 which actually determines whether the number has been called more than three times since in that case no further attempts would be made and hence no information will have been received from that facility. A No decision therefore feeds a command to print 16 x's in 328 to indicate to the operator that attempts were made to call but that for different reasons no information was received. The output of decision 328 feeds junction 330 which in turn commands the teletype off in 332 which also determines the further testing of the dial frequency switches since junction 234 is fed which in turn feeds the last switch decision 236 for retesting the O interval switches.

In the event the text has been received correctly, which means less than three errors, a print command 334 causes a printout from memory of the received time and date and unusual occurrences from memory received from the transaction terminal. In view of the specific information requested to be printed out, certain calculations are performed such as the command to print entry and exit counts 336. In addition information concerning the seller's ID number, the price categories sold, the number of tickets sold per category, the gross take per category per seller at the transaction terminal is printed out as determined by function 338. Since the recorded information is timed as per the individual seller ID number that is on duty at the individual facility, the output is continually monitored by decision 340 for the last seller's report which is continually recycled until received. The same information is then prepared and printed for each seller ID at the facility.

When the last seller's report decision 340 is made, a command to print the gross take for the polling period 342 is commanded and a print is made of the ticket issuances against pass type documents for each seller ID is commanded as at 334. A decision for the last seller's report 346 is continually tested until the last seller's report is made, at which point a Yes decision feeds junction 330 which eventually commands the teletype to go off as at 332.

A review of the main loop will show that if a print request was made at decision 214 indicating that the operator had pressed the switch requesting the printing of information in memory a jump is made from print request decision 214 to junction 350 which eventually feeds junction 314 for setting up the print routine for turning the teletype on as previously discussed. In addition, if a print request decision 222 was made indicating that the operator required a complete testing of the memory, the output of the print request decision 222 feeds a load memory with fixed data 352 which receives this information from storage and at the same time destroys by cancellation the previous information loaded in memory from any one of the facility codes. It was for this reason in describing the main loop that it was necessary to test the main power in decision 216 before allowing a testing to be made of the print request decision 222. The output of the load memory with fixed data function 352 feeds junction 350 which in turn feeds the main loop for turning the teletype on as mentioned previously.

Reviewing again the last switch decision 236 which was reviewed in connection with the dial frequency switch or the polling interval switches, we now note that a last switch decision indicated as Yes feeds a go to read manual dial select switch command 354 which is turn feeds junction 358 which sets up the read manual dial select switch command 208 located in the main loop.

A review of the programming flow chart for the central control unit will show that the complete operation of the CCU is maintained by properly programming the micro-computer and sub-routines to thereby provide complete and automatic testing and operation of the plurality of independent facilities located throughout the country with a minimum of memory and hard wire controls.

Figure 7:
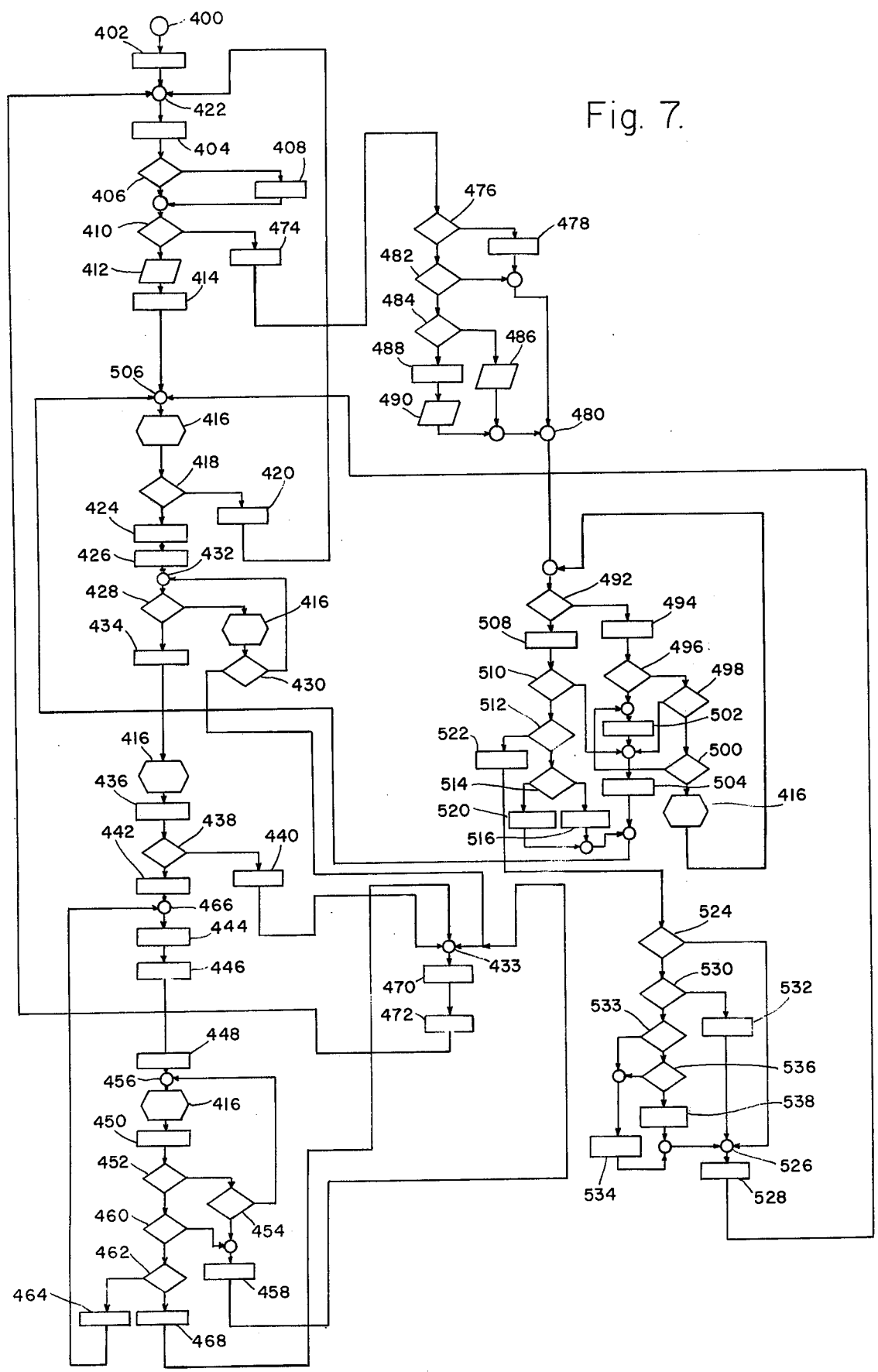
FIG. 7 is a flow diagram for the transaction terminal having a single showing as illustrated in FIG. 1.

Referring now to FIG. 7, there is shown a flow diagram illustrating the functions of the transaction terminal located at the individual facilities. The functions to be described will include the necessary program for selling the tickets, control of turnstile operation, the continuing sampling of all operations at the facility in question, and the control of communications via the telephone lines with a call originating from the central processing unit.

The machine is energized by start sequence 400 which immediately causes an initialized function to clear memory, reset all controls, and establish that full power is turned on.

An update time and date sequence 404 is then energized which is similar to the one previously described in connection with the central processing unit. The time pulses are derived from the local 60-cycle power source and beginning with time zero when the equipment is initially energized, the time is updated every 6 minutes. A decision is then made at 406 to determine if a new price code is in effect. Initially of course there is no price code and the decision will be No, however, normally the new price code is time dependent since conventional movie houses charge diferent prices for the same category ticket at different times with the most expensive ticket being sold in the prime evening times. The local management will have control over the price charged by inserting the proper price codes into the memory after the machine is on and hence, at some point in time, a price change based upon time will be detected causing an update price function 408 to be energized resetting the programmed price to be charged for the next time sequence.

The ticket seller control is under the direct control of the ticket seller who may turn the equipment on by a suitable key similar to an ignition key. There are of course many reasons why the ticket seller may leave her post at the ticket seller control and when she does so, only the ticket selling function is disabled. It is still possible as the sequence will show for a person who has previously purchased a ticket to utilize the ticket to gain entrance into the movie house or to allow the transaction terminal to answer telephone calls from the remotely located central control unit.

A decison at 410 determines whether the seller key is on and whether a ticket seller is on duty.

A No decision based upon the seller's key not being inserted in the ticket seller control will indicate that a seller is not on duty at that time which will cause at 412 a reset of all controls on the ticket seller and a reset of the display unit. In this configuration it is impossible to buy and sell a ticket since all controls on the ticket seller control are disabled until the seller returns on duty and inserts a key into the ticket seller control.

At this point in time a function to go check telephone 414 is energized to determine if the central control unit is calling a particular facility. However, before any telephone is answered, a sub-routine to check entrance and exit passages 416 is energized to determine whether there is any activity at the entry turnstile in order to allow a patron to enter or leave the limited access area. The program set forth by 416 is more fully illustrated in FIG. 8 and appears at many different places in the overall program in order to provide rapid sampling of the ticket taker to thereby provide fast service and recording of information caused by persons entering or leaving the facility.

After servicing patrons entering and leaving the facility as defined at 416, a decision is made of whether the telephone is still ringing at 418.

Completion of the entry/exit passage sub-routine 416 then results in a decision 418 of whether the telephone is ringing. A No decision establishes a function 420 to set a timer having a 5 second limit and then to complete the loop by returning to junction 422 which feeds update time and date function 404 to thereby close the loop and continuing the checking of the controls. The 5 second timer limit is inserted in order to break the loop at the end of each 5 seconds if for any reason there is some hangup in the telephone detecting loop circuit.

A Yes decision by 418 that the telephone is ringing energizes function 424 which places the telephone off-hook and feeds function 426 which resets all displays on the display unit and disables the controls on the ticket seller and again sets a 5 second timer within which the telephone carrier signal must be detected. Function 426 thereby establishes that tickets cannot be sold when telephone communications are established with the central processing unit.

A decision is then made at 428 whether the carrier has been detected, which act must be accomplished within 5 seconds as determined by function 426. A No decision causes a check entry and exit passage sub-routine 416 until a decision is made in 430 whether the 5 second time is up. If the answer is No the output loop feeds junction 432 which again feeds decision 428 to detect the carrier. Should the 5 second time limit be exhausted by decision 430 and the carrier still undetected, the output of decision 430 will energize a hangup circuit fed by junction 432. If the carrier is detected at decision 428 a go to receive function 434 is energized in order to prepare the transaction terminal for receiving the ID number from the central control unit.

At this point sub-routine 416 for checking the entry and exit passages is again energized in order to allow the passage of persons into the movie area and also to detect the operation of any of the photocell sensors in the entry and exit areas.

The indentification plug representing the hard wired ID number of the central processing unit is received by function 436 and a decision is made in 438 regarding an error received from the central processing unit. A Yes decision would mean that the ID number received from the central processing unit did not verify with the previously recorded ID number, indicating there was an error in the text or possibly a wrong number or for any other reason there was a lack of comparison. A Yes decision indicating there was an error energizing a go to hang up phone function 440 which again energizes junction 433 feeding a telephone hang up loop.

A decision by 438 indicating the proper ID number was received will energize a set timer function 442 which allows a maximum of 5 second delay between characters. The timer provides the means for taking the transaction terminal off the telephone line should there be a delay for any reason, which could of course include loss of transmission, damage to the telephone equipment, or even loss of power in the transaction terminal.

Figure 8:
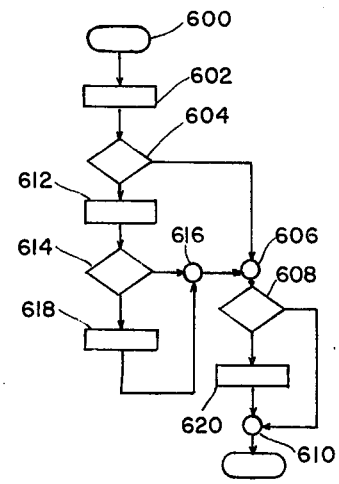
FIG. 8 is a flow diagram illustrating a sub-routine for checking the passage of patrons through the turnstiles.

At this point a transmit text function 442 is energized which not only transmits text in memory but also transmits certain format control characters to the central control unit. Upon completion of the transmission, a go to receive answer function 446 is energized to receive communication from the central control unit that the message had been promptly received or in the alternative a request is made to retransmit the message due to less than three errors. A set timer function 448 is energized which limits the time for receiving an answer from the central control unit to 5 seconds. To check entry and exit passage, sub-routine 416 is again energized as illustrated in FIG. 8 to allow passage through the turnstiles and to detect any movement or interruption of the photocells and the rotation of the turnstile mechanisms.

A receive answer function 450 looks for an inquire character from the central control unit which will request a retransmission due to less than three errors. In addition, if the message is properly received, the time and date update signal will be transmitted from the central control unit to update and synchronize the time of the facility with the central control unit. In addition, a clear memory signal will be received indicating that the information was received by the central control unit without error. A decision in 452 determines whether the information has been received. A No decision results in a further decision to check the timer in 454 to determine if the 5 second time is up. If No, the circuit recycles to junction 456, which again feeds the sub-routine 416 and recycles in the loop just described until either an answer is received or until the 5 second time has expired. If the decision in 454 is the 5 seconds has expired without an answer being received from the central control unit, a go to hang up phone function 450 is energized which eventually feeds junction 433 which defines the hang up phone loop.

A decision in 452 that an answer has been received will then require a decision in 460 as to whether there was an error in the answer received by the facility. If the answer is Yes, then go to hang up phone function 458 is energized which again energizes the hang up loop circuit fed by junction 433. If there is no error in the transmission, then a decision in 462 is made to determine if the inquire character has been received from the central control unit. It will be remembered that the inquire character is transmitted from the central control unit in the event a retransmission of the information is requested.

Receipt of the inquire character will energize a go to retransmit text function 464 which energizes junction 466 to again cause transmit text function 444 to be energized causing a retransmission of the text and the format control characters in the text from the facility to the central control unit.

A decision in 462 that no inquire character has been received will energize function 468 and will load the received update time and date information received from the CCU, place the information in memory, and clear the data memory of all text material. Energizing a function 468 is the last act that occurs upon completion of a good transmission of all data from the facility to the CCU and the output feeds junction 433 which energized the hang up loop circuit mentioned previously. The hang up loop is fed by junction 433 which energizes function 470 that hangs the telephone up which is to go on hook and turns the hold indicator lights off, thereby enabling the circuits on the ticket seller control since it must be remembered that during a communication cycle it is impossible for the ticket seller to sell any tickets. However, it is possible for a previously sold ticket to be used in view of the many operations of the 416 sub-routine contained in the loop. The time is updated by go to update time function 472 which updates the time information every 6 minutes in the transaction terminal. The circuit then returns to junction 422 in the start loop which again energizes the update time and date 404 and restarts the main loop for selling tickets and establishing communication if called.

The foregoing explanation explained the communication and ticket handling process based upon the initial decision at 410 that the seller's key was not inserted and hence the seller was not on duty. It will be apparent therefore that the equipment is continuously on duty 24 hours a day and can be called at any time either sequentially or on a programmed time sequence as mentioned earlier. The explanation also illustrates how previously sold tickets may be used to gain entrance to the system and, further, how entry and exit areas are continually monitored by the programmed micro-computer.

If we now assume that the seller is on duty and that the seller's key has been inserted into the ticket reader, we will find that decision 410 will be Yes, indicating that the seller's key is on. A review of the functional equipment will show that the individual seller not only inserts her key into the ticket reader but also she must identify herself to the ticket reader by inserting a prerecorded employee's card which identifies herself by ID number in order that all transactions that take place from that moment on are charged to that particular seller's ID number. This information is then recorded and available for transmission to the central processing unit in order to obtain a complete readout of the sales and who was on duty when those sales took place in order that a proper accounting of funds and passage of persons can be accounted for to a specific person on duty.

The Yes decision that the seller's key is on causes a go to check controls function 474 to be energized to determine the status of the individual push buttons on the ticket seller's control.

A decision is then made at 476 whether a seller is on duty, which decision is a function of whether the seller has inserted her prerecorded magnetically encoded card into the ticket reader for storage in memory. The ticket seller must insert her card into the ticket reader every time the seller's key is removed and inserted into the ticket seller. The act of removing the key wipes out the memory of the ticket seller's card. Inserting the key therefore requires that the seller insert her card which is detected by decision 476. In the absence of the seller removing her key, subsequent tests of this particular loop will be made from memory indicating that the seller is on duty.

A No decision causes a go to check terminal reader function 478 to be energized which eventually feeds junction 480. Function 478 will determine if a new seller's card has been inserted into the ticket reader, whereas decision 476 determines whether a seller is on duty and has previously inserted a seller's card which is now in memory.

A Yes decision in 476 indicating that the seller is on duty and has previously inserted a seller's card into memory will now cause a decision 482 to determine whether any new button has been depressed by the ticket seller. A No decision will eventually feed junction 480. A Yes decision will now energize decision 484 which will determine whether a read button was depressed. A review of the buttons on the ticket seller will show that three categories of buttons for adults-A, intermediates-B, or children-C, or a read button may be depressed by the ticket seller. Decision 484 will simply determine whether a read button was depressed. If Yes, a clear display operation 486 is energized which clears the display unit and eventually feeds junction 480.

A No decision from 484 will indicate that either buttons A, B or C were depressed and hence function 488 is energized to set up for writing a ticket. A display of price of ticket 490 is energized which causes a display from the display unit which then feeds junction 480.

The next sequence of operations will determine which of the buttons has been depressed and if they are right buttons, meaning A, B or C buttons, the appropriate information is encoded on the card and recorded. If a read button is depressed the appropriate information is detected from the card and properly displayed on the display unit. At this time, however, if a read button was depressed the display would clear it and if an A, B or C button was depressed the circuits would be set up to write a ticket and the appropriate display for the ticket sold shown on the display unit.

A decision in 492 determines whether a ticket document has been sensed at the ticket seller terminal. A No decision causes a test read request function 494 to check the status of the read buttons. A decision 496 tests the actual buttons and determines whether the read button has been depressed. This test is necessary since it is possible to set up the machine and issue a ticket based upon an inserted pass. However, depressing the read button will cancel the information concerning the sale of the ticket by the previously inserted pass. Hence, a further decision in 498 is necessary to determine whether the pass flag has been set. A Yes decision energizes a 5 second timer 500 which is necessary to lock out the equipment should a jam or other mechanical malfunction occur in the card handling mechanism. If the 5 seconds are not up, the check entry and exit passage sub-routine 416 is again energized to handle the movement of patrons into the movie house and through the entrance and exit turnstiles after which function 492 is again energized to determine whether the document has been inserted in the ticket seller control.

A Yes decision that the 5 second timer is up at 500 will energize a clear pass flag 502 that automatically clears all information relative to the sale of a pass thereby clearing the machine by feeding a go to check telephone function 504 to determine if the central processing unit is calling the transaction terminal, after which the telephone answering routine loop is again energized by feeding junction 506 which again checks the check entry and exit sub-routine 416 contained in the communication loop.

A decision at 492 that a document has been sensed at the ticket seller terminal reader will energize a 5 second timer 508 which is again necessary in the event there is some mechanical function with the ticket handling equipment and the 5 second timer prevents a tie-up of the computer should a jam or other mechanical malfunction occur.

A decision is then made at 510 as to whether the document is ready to be processed. Remembering that the transport mechanism feeding either the ticket or the pass to the read station moves the document at three inches a second or in other words, it will take approximately 2½ seconds to move the ticket in the position to be processed. Decision 510 thereby produces a negative decision during the time interval which feeds a go to check telephone 504 function to determine whether the central processing unit is calling the facility.

A decision by 510 that the document is ready to be processed causes another decision at 512 to determine whether the document is a pass. Since it must be remembered that the ticket seller could have inserted a pass which had to be read prior to issuing a ticket on the pass or, in the alternative, the ticket seller may be inserting a new price schedule for insertion into the memory or possibly a new seller is now on duty and is inserting a new ticket with a new ID card. Another alternative is that a defective pass is being inserted to be read and interpreted by pressing the read button to cause a display on the display unit.

A decision by 512 that the document is not a pass will cause still another decision at 514 to determine if a read button had been depressed. A Yes answer will cause function 516 to read the ticket and display the selected field on the display unit and eventually feed junction 506 at the beginning of the cycle to repeat and sample the program.

A negative decision by 514 indicating that a read button had not been depressed indicates that a sale of a ticket in either class A, B or C is being made and function 520 is energized to encode the ticket and increment the ticket count, reset the display on the display unit and reset all controls, after which junction 518 is energized which feeds junction 422 to repeat the sampling cycle for the program.

Returning now to decision 512 and assuming that the document inserted in the ticket reader under control of the ticket seller is a pass, then a Yes decision will energize a read document function 522 to determine whether the document is a pass or not since at this time all we have established is that the document is not a ticket.

A decision 524 establishes whether the document is acceptable and if not junction 526 is energized which feeds a go to check telephone function 528 to determine if the central processing unit is calling, after which junction 506 at the beginning of the program is impulsed thereby repeating the programming functions again in a repetitive manner. If the document determined by decision 524 is acceptable, a decision 530 is made to determine if the document is a price set document used by management to load the memory with a new price schedule. A Yes decision energizes function 532 which loads the new prices in memory and indicates the number of price documents needed to complete a new price schedule since more than one document is needed to load the memory with a completely new price schedule. Completion of function 532 feeds junction 526 causing a telephone check in function 528 and the repetition of the initial program.

A decision by 530 that the document is not a price document causes a decision 534 to determine if the document is a seller identification card since it was pointed out that every time the seller removes her key the memory of her ID card is erased thereby requiring a new memory card to be inserted whenever a key is again inserted in the seller's control unit. A No decision by 533 indicates that the document must be a pass and hence function 534 is energized to set up and encode a pass to clear the display unit and all controls and to turn the pass indicator on in the display unit. Upon completion of function 534 junction 526 is impulsed causing a check of the telephone as defined in function 528 and a repeat of the original program.

A decision by 532 that the document is a seller's ID card then causes a decision by 536 to indicate whether a seller is on duty. A decision that a seller is not on duty would mean that the inserted card is a seller's ID card for a new seller and hence function 538 is energized to enter the new seller in memory after which junction 526 is energized and function 528 causing a recheck of the telephone lines and eventual return to sampling the program is initiated. A decision by 536 that a seller is on duty after 532 had decided that a seller's ID card had been inserted will cause a Yes decision and the energizing of function 534 and the eventual issuance of a pass. The reasoning being that a properly inserted seller's ID card issued by management inserted by a seller who is on duty is treated as a pass and hence the proper encoding will take place to issue a ticket based upon the seller's ID card.

Referring now to FIG. 8, there is shown an expanded flow diagram capable of performing the check entry/exit passage routine identified as item number 416 indicated in the transaction terminal of FIG. 7.

The function of the progam of FIG. 8 is to allow the transaction terminal to periodically sample activity at the entrance turnstile and the exit turnstile in order to process patrons having a ticket and wishing to enter the limited access area. At the same time the individual sensors such as the photocell sensors located in the entry and exit area, and the turnstile counters located on both entry and exit turnstile are processed and sampled in order to record movements and record these movements. The sub-routine illustrated in FIG. 8 is repeated many times in the flow diagram of FIG. 7 to take advantage of the fast operation of the mini-computer while certain time consuming operations such as reading and writing and the establishment of communications via the telephone lines are taking place.

The sub-routine of FIG. 8 is energized whenever an impulse is received at the start 600. The first step requires a reading of the entry and exit passage sensors and the entry reader 602. This is basically accomplished by sampling the photocell sensors at the entry and exit turnstiles, the turnstile switches located on both entry and exit turnstiles, and the ticket taker by detecting the presence of a ticket in the entry slot of the ticket taker. Interruption of the photocell sensors or either of the turnstiles is then recorded for transmission at a later time to the central processing unit.

A decision is made at 604 whether data is ready at the entry reader, also identified as a ticket taker by sensing the condition of a switch in the ticket taker which indicates the presence of a ticket. If the decision is No meaning that no ticket is being inserted in the ticket reader, junction 606 is fed which in turn feeds decision 608 which determines whether there is any passage sensor activity at either the entry or exit passageways. A No decision feeds junction 610 which ends the sub-routine operation and allows the flow chart in FIG. 7 to continue.

If the decision at 604 is that a ticket is presented at the ticker taker, the Yes decision feeds a process data function 612 which is to record the data, verify the time and price. A decision in 614 is made whether the ticket data is correct which basically causes a verification of the ticket data as to price, facility and time, to determine whether the ticket is being used at the corect facility and whether the time the ticket is being used is correct as to the imprinted price. Should the decision be No then junction 616 is fed which in turn feeds junction 606 causing a sensor check decision in 608 as mentioned previously.

A decision by 614 that the data is correct will operate the function 618 which unlocks the entry turnstile and if the ticket being inserted is an intermediate or minor ticket also identified as a B or C ticket, then the classifier lights and the sequence camera are energized. The output of function 618 feeds junction 616 and junction 606 which repeats the check of the condition of the sensors in decision 608.

A decision in 608 that there is passage sensor activity caused by a breaking of the photocell sensors in either the entry or entrance passageway will cause a Yes decision energizing function 620 to increment appropriate passage counts, lock the turnstile, only if there if there is no credit left meaning that the turnstile has been rotated after being energized by function 618. The output of function 620 feeds junction 610 which again continues in the appropriate place in the flow chart illustrated in FIG. 7.

It will be appreciated by those skilled in the art that the flow chart illustrates a sequential operation performed under the control of the micro-computer. There are certain operations that inherently require a long period of time such as moving the card in the reader from an inserted position to a read position. A complete movement of the card may take 2, 3 or 4 milliseconds, whereas the micro-computer can perform all the functions of the flow chart such as that illustrated in FIG. 7 in the order of 6 microseconds. The use of sub-routines therefore allows capability of the computer at all times while slower operations are being performed since it must be remembered that the computer only performs one operation at a time but at a rate that the user believes many things are occurring simultaneously.

We claim:
1. A ticket dispensing and accounting system for remotely monitoring in real time all revenue transactions and passage of patrons through an amusement area comprising, computer storage means under control of a sales agent for recording accounting information such as number of tickets sold and issued, time, price, point of sale and sales agent, a selectable ticket under control of said sales agent and adapted to have magnetically encoded information written onto and read from said ticket, ticket reading and writing means under control of said sales agent for encoding magnetic information from said computer storage means onto said ticket, means for issuing encoded tickets only upon receipt of the proper revenue, reading means adapted to be located at an entry station and communicating with said computer storage means in real time for reading said magnetically encoded tickets, means responsive to selected encoded information on said ticket for independently verifying the patron seeking entry and the ticket being used, means for generating an entry signal in response to a comparison between a portion of said information in said computer storage means and information encoded on said ticket, and means for interrogating and reading recorded information in said computer storage means at remote locations on a timed basis whereby a running check on revenue and passage of patrons can be made on a real time basis.

2. A ticket dispensing and accounting system according to claim 1 which includes,
  means including said ticket reading and writing means for reading updated magnetically encoded information onto said computer storage means, and
  selecting means under control of said sales agent for selecting certain stored information from said computer storage means to be magnetically encoded on said ticket.

3. A ticket dispensing and accounting system according to claim 1 which includes display means connected to said computer storage means for displaying information magnetically encoded on said ticket as read by said ticket reading and writing means.

4. A ticket dispensing and accounting system according to claim 1 which includes a controllable entry restraining device adapted to prevent entry, and
  means for controlling said restraining device by said entry signal whereby passage through said restraining device is enabled.

5. A ticket dispensing and accounting system according to claim 1 which includes a sequence camera directed in the area of said reading means and selectively operated by predetermined information read from said ticket and the generation of said entry signal.

6. A ticket dispensing and accounting system according to claim 1 which includes external means connected with said computer storage means and responsive to movement past said reading means for detecting and recording said movement in said computer storage means.

7. A ticket dispensing and accounting system according to claim 1 which includes,
  means responsive to a proper phone interrogation for transmitting said recorded information to a central control unit, and
  means located at said central control unit for recording and displaying said recorded information.

8. A remote reporting system for monitoring in real time all revenue transactions and passage of patrons through an amusment area comprising a plurality of individual facilities each comprising computer storage means under control of a sales agent for recording accounting information such as number of tickets sold and issued, time, price, point of sale and sales agent,
  a selectable ticket under control of said sales agent adapted to have magnetically encoded information written onto and read from said ticket,
  ticket reading and writing means under control of said sales agent for encoding magnetic information from said computer storage means onto said ticket,
  means for issuing encoded tickets only upon receipt of the proper revenue,
  reading means adapted to be located at an entry station and communicating with said computer storage means in real time for reading said magnetically encoded ticket,
  means responsive to selected encoded information on said ticket for individually verifying the patron seeking entry and the ticket being used,
  means for generating an entry signal in response to a comparison between a portion of said information in said computer storage means and information encoded on said ticket,
  means in each facility responsive to a proper phone interrogation for transmitting said recorded information to a remote central control unit, and
  means located at said central control unit for recording and displaying received information from each of said facilities.

9. A remote recording system according to claim 8 which includes means for sequentially calling each of said facilities according to a predetermined code and sequentially displaying said recorded information as received.

10. A system for remotely monitoring in real time all revenue transactions and passage of patrons through an amusement area comprising,
  a selectable ticket adapted to have magnetically encoded information written onto and read from said ticket,
  means for magnetically encoding housekeeping information including price, point of sale, sales agent and time of sale information on said ticket,
  means for issuing encoded tickets only upon receipt of the proper revenue,
  means for reading magnetically encoded information on said ticket and recording said information,
  means responsive to selected encoded information on said ticket for independently verifying the patron seeking entry and the ticket being used,
  means responsive to reading said magnetically encoded information on said ticket and comparing said information in real time with said stored information for allowing access to said amusement area,
  means responsive to movement into and out of said amusement area for incrementally recording said passage,
  means responsive to a proper phone interrogation for transmitting said recorded information to a central control unit, and
  means located at said central control unit for recording and displaying said recorded information.

11. A system for remotely monitoring in real time all revenue transactions and passage of patrons through an amusement area comprising,
  an amusement area having a controlled entrance and a controlled exit,
  ticket reading and writing means located outside said amusement area for issuing magnetically encoded tickets having recorded information of price, time and facility,
  means for issuing encoded tickets only upon receipt of the proper revenue,
  said controlled entrance including an electrically operated turnstile having a mechanically operated counter and an electrically operated counter,
  a first photocell system cooperating with said controlled entrance for detecting movement of persons through said controlled entrance,
  ticket reading means located outside said amusement area and in close proximity to said controlled entrance for receiving and reading said magnetically encoded ticket,
  means for operating said entrance turnstile in response to reading a properly encoded ticket,
  means responsive to selected encoded information on said ticket for independently verifying the patron seeking entry and a ticket being used, said controlled exit including a freely rotating turnstile having a mechanically operated counter and an electrically operated counter, and a second photocell system cooperating with said controlled exit for detecting movement of persons through said controlled exit.

12. A system for remotely monitoring in real time all revenue transactions and passage of patrons through an amusement area comprising, a selectable ticket adapted to have magnetically encoded information written onto and read from said ticket, means for magnetically encoding record keeping information such as price, point of sale, sales agent and time of sale information on said ticket, means for issuing encoded tickets only upon receipt of the proper revenue, means for reading the magnetically encoded information on said ticket and recording said information, means responsive to reading said magnetically encoded information for allowing access to an amusement area, means responsive to selected encoded information on said ticket for individually verifying the patron seeking entry and the ticket being used, means responsive to movement into and out of said amusement area for incrementally recording each passage, means responsive to a proper phone interrogation for transmitting said recorded information to a remotely located central control unit, and means located at said central control unit for sequentially recording and displaying said recorded information.

13. A method for remotely monitoring in real time all revenue transactions and passage of patrons through an amusement area comprising the steps of:

programming a computer storage to record accounting information such as number of tickets sold and used, time, price, point of sale, sales agent and number of patrons entering and leaving the area, receiving the proper revenue for the ticket sold, controlling the computer storage for dispensing an encoded ticket appropriate to the ticket sold, reading the encoded ticket and communicating with the computer storage in real time for allowing passage in the presence of a properly encoded ticket, independently verifying the patron seeking entry and the ticket being sold, and interrogating and reading recorded information in the computer storage at remote locations on a timed basis whereby a running check on revenue and passage of patrons can be made on a real time basis.

* * * * *